United States Patent
Zheng

(10) Patent No.: US 11,297,214 B2
(45) Date of Patent: Apr. 5, 2022

(54) LENS MODULE AND ELECTRONIC DEVICE HAVING SAME

(71) Applicant: TRIPLE WIN TECHNOLOGY(SHENZHEN) CO.LTD., Shenzhen (CN)

(72) Inventor: Yong-Gang Zheng, Shenzhen (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 230 days.

(21) Appl. No.: 16/844,352

(22) Filed: Apr. 9, 2020

(65) Prior Publication Data

US 2021/0185200 A1   Jun. 17, 2021

(30) Foreign Application Priority Data

Dec. 16, 2019   (CN) .......................... 201911294783.8

(51) Int. Cl.
  *H04N 5/225*   (2006.01)
  *G02B 7/02*   (2021.01)
  *H04M 1/02*   (2006.01)
  *G02B 7/00*   (2021.01)

(52) U.S. Cl.
  CPC ........... *H04N 5/2257* (2013.01); *G02B 7/006* (2013.01); *G02B 7/021* (2013.01); *H04M 1/0264* (2013.01); *H04M 2250/52* (2013.01)

(58) Field of Classification Search
  CPC .. G03B 37/04; H04N 5/2258; H04N 5/23238; H04N 5/2253; H04N 5/2254; H04N 13/239; H04N 13/243; H04N 5/2257; H04N 5/2251; G02B 7/021; G02B 7/006; H04M 1/0264; H04M 2250/52
  See application file for complete search history.

(56) References Cited

U.S. PATENT DOCUMENTS

| 10,114,221 | B1 * | 10/2018 | Evans, V | H04N 5/2252 |
| 10,237,475 | B2 * | 3/2019 | Wang | G03B 11/00 |
| 2014/0048997 | A1 * | 2/2014 | Cheng | H04N 5/2253 269/303 |
| 2016/0337584 | A1 * | 11/2016 | Masuda | H04N 5/2251 |
| 2017/0195533 | A1 * | 7/2017 | Seo | G03B 37/00 |

(Continued)

FOREIGN PATENT DOCUMENTS

| TW | M539641 U | 4/2017 |
| TW | 201905525 A | 2/2019 |

*Primary Examiner* — Chiawei Chen
(74) *Attorney, Agent, or Firm* — ScienBiziP, P.C.

(57) ABSTRACT

A lens module includes a circuit board, a first support base, a second support base, a first lens assembly, and a second lens assembly. The first support base is mounted on a first surface of the circuit board. The first surface includes a first circuit interface. The first support base includes a third circuit interface. The first lens assembly is mounted on the first support base and electrically coupled to the circuit board through the third circuit interface and the first circuit interface. The second support base is mounted on a second surface of the circuit board. The second surface includes a second circuit interface. The second support base includes a fourth circuit interface. The second lens assembly is mounted on the second support base and electrically coupled to the circuit board through the fourth circuit interface and the second circuit interface.

20 Claims, 5 Drawing Sheets

(56) References Cited

U.S. PATENT DOCUMENTS

| | | | | |
|---|---|---|---|---|
| 2018/0205883 A1* | 7/2018 | Wang | .................. | G03B 11/00 |
| 2018/0376076 A1* | 12/2018 | Park | .................. | H04N 5/265 |
| 2019/0052785 A1* | 2/2019 | Ai | .................. | H04N 5/22521 |
| 2019/0342476 A1* | 11/2019 | Abbas | .................. | G02B 13/06 |
| 2020/0053260 A1* | 2/2020 | Qi | .................. | G02B 27/644 |
| 2021/0067675 A1* | 3/2021 | Yang | .................. | H04M 1/0264 |
| 2021/0112659 A1* | 4/2021 | Park | .................. | H01Q 1/243 |

* cited by examiner

LENS MODULE AND ELECTRONIC DEVICE HAVING SAME

FIELD

The subject matter herein generally relates to lens modules, and more particularly to a lens module having a double-sided shooting function applicable in an electronic device.

BACKGROUND

Many electronic devices come equipped with camera devices. A camera device generally includes a lens module mounted to a circuit board. However, an electronic device that has a double-sided shooting function generally requires an additional circuit board for mounting a second lens module, which increases a required size of the lens module assembly.

BRIEF DESCRIPTION OF THE DRAWINGS

Implementations of the present disclosure will now be described, by way of embodiments, with reference to the attached figures.

DETAILED DESCRIPTION

Figure 1:
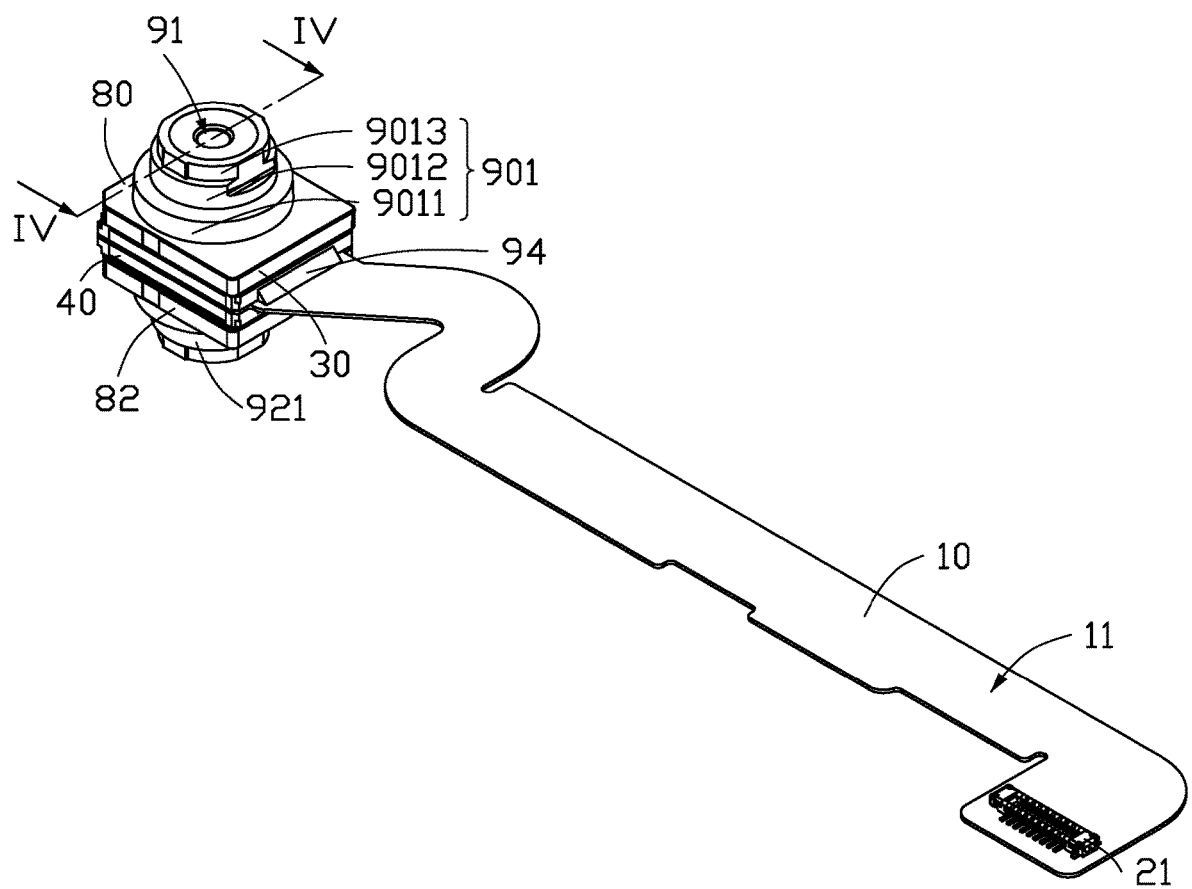
FIG. 1 is an assembled, isometric view of an embodiment of a lens module.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 2:
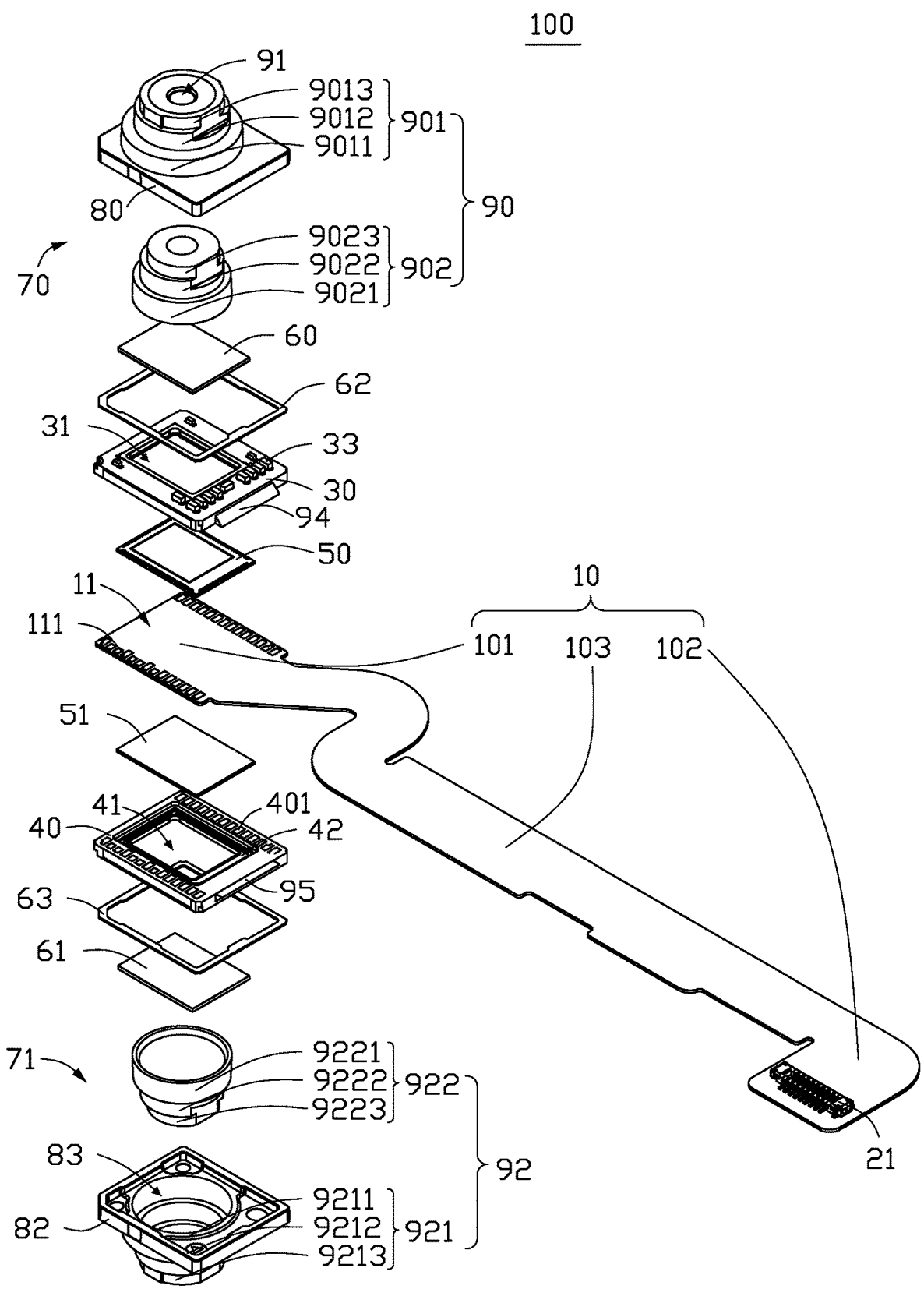
FIG. 2 is an exploded, isometric view of the lens module in FIG. 1.
Figure 3:
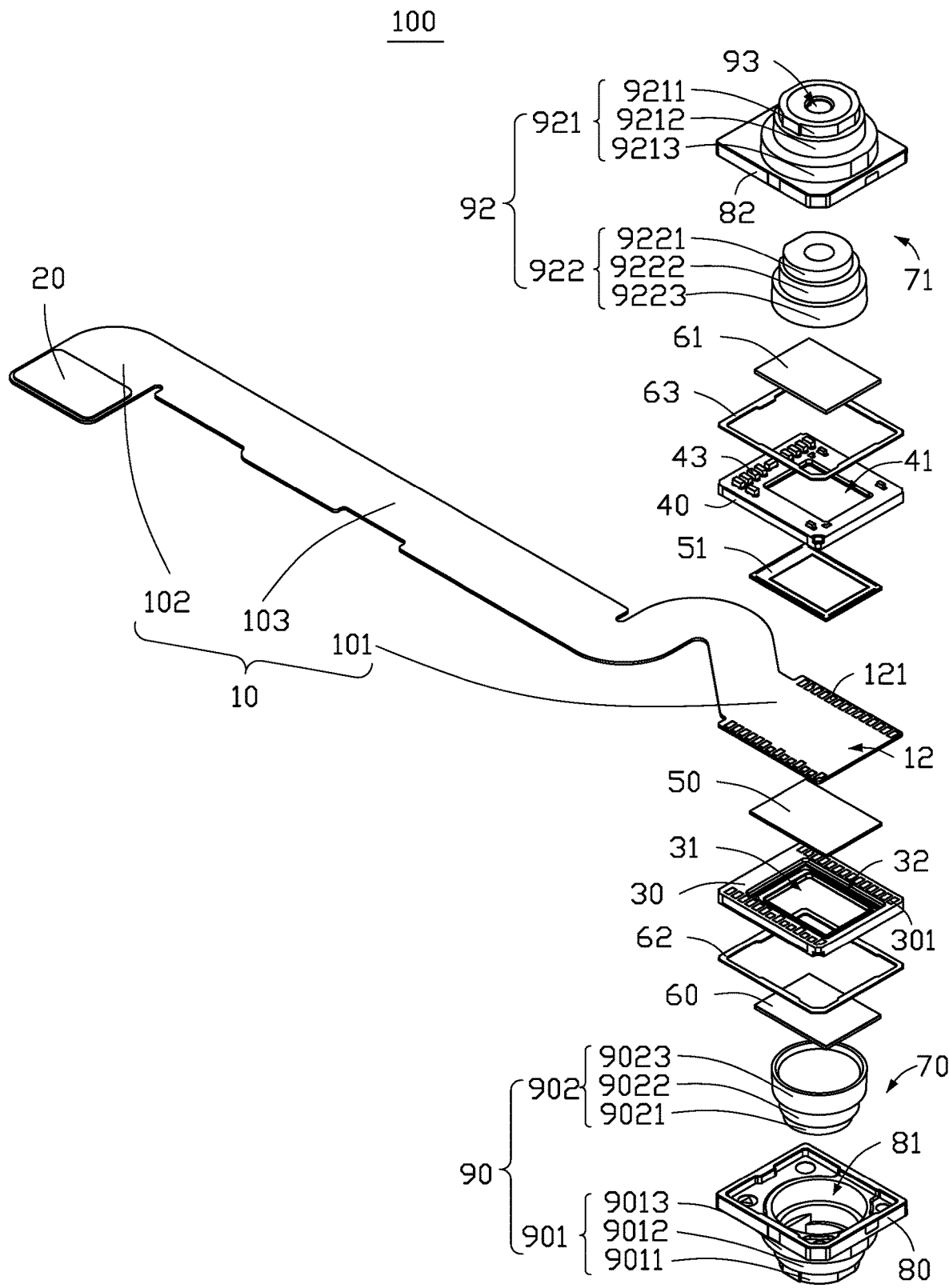
FIG. 3 is similar to FIG. 2, but showing the lens module from another angle.

FIGS. 1-3 show an embodiment of a lens module 100. The lens module 100 includes a circuit board 10, a first support base 30, a second support base 40, a first photosensitive chip 50, a second photosensitive chip 51, a first filter 60, a second filter 61, a first lens assembly 70, and a second lens assembly 71.

The circuit board 10 includes a first surface 11 and a second surface 12 opposite the first surface 11. The first surface 11 and the second surface 12 are respectively provided with a first circuit interface 111 and a second circuit interface 121. The circuit board 10 may be a flexible board, a rigid board, or a rigid-flexible board. In one embodiment, the circuit board 10 is a rigid-flexible board and includes a first hard portion 101, a second hard portion 102, and a flexible portion 103. The flexible portion 103 is between the first hard portion 101 and the second hard portion 102. The first circuit interface 111 and the second circuit interface 121 are located on the first hard portion 101.

A reinforcement plate 20 is mounted on the second surface 12 on the second hard portion 102. The reinforcement plate 20 is configured to enhance a mechanical strength of the second hard portion 102. An electrical connection portion 21 is mounted on the first surface 11 on the second hard portion 102. The electrical connection portion 21 is used for signal transmission between the lens module 100 and an electronic device (not shown). The electrical connection portion 21 may be a connector or a gold finger.

The first support base 30 is mounted on the first surface 11 on the first hard portion 101. A third circuit interface 301 is provided on a surface of the first support base 30 facing the circuit board 10 for electrical connection with the first circuit interface 111. The first circuit interface 111 and the third circuit interface 301 may be gold fingers. In other embodiments, the first circuit interface 111 and the third circuit interface 301 may be changed according to actual conditions. A material of the first support base 30 may be metal or plastic. The first support base 30 is substantially a hollow rectangular parallelepiped. The first support base 30 defines a first opening 31 passing through the first support base 30. The first opening 31 is substantially rectangular. The first opening 31 has a first central axis (not shown in the figures), and the first support base 30 includes a first annular boss 32 extending from an inner wall of the first opening 31 toward the first central axis. A plurality of first electronic components 33 is mounted on a surface of the first support base 30 facing away from the circuit board 10. The first electronic components 33 may be passive components such as a resistor, a capacitor, a diode, a triode, a transistor, a relay, an electrically erasable programmable read-only memory (EEPROM), and the like.

The second support base 40 is mounted on the second surface 12 on the first hard portion 101. A surface of the second support base 40 facing the circuit board 10 is provided with a fourth circuit interface 401 for electrical connection with the second circuit interface 121. A material of the second support base 40 may be metal or plastic. The second circuit interface 121 and the fourth circuit interface 401 may be gold fingers. In other embodiments, the second circuit interface 121 and the fourth circuit interface 401 may be changed according to actual conditions. The second support base 40 is substantially a hollow rectangular parallelepiped. A second opening 41 is defined in the second support base 40 and passes through the second support base 40. The second opening 41 is substantially rectangular. The second opening 41 has a second central axis (not shown), and the second support base 40 includes a second annular boss 42 extending from an inner wall of the second opening 41 toward the second central axis. A plurality of second electronic components 43 is mounted on a surface of the second support base 40 facing away from the circuit board 10. The second electronic components 43 may be passive components such as a resistor, a capacitor, a diode, a triode, a transistor, a relay, an EEPROM, and the like.

Figure 4:
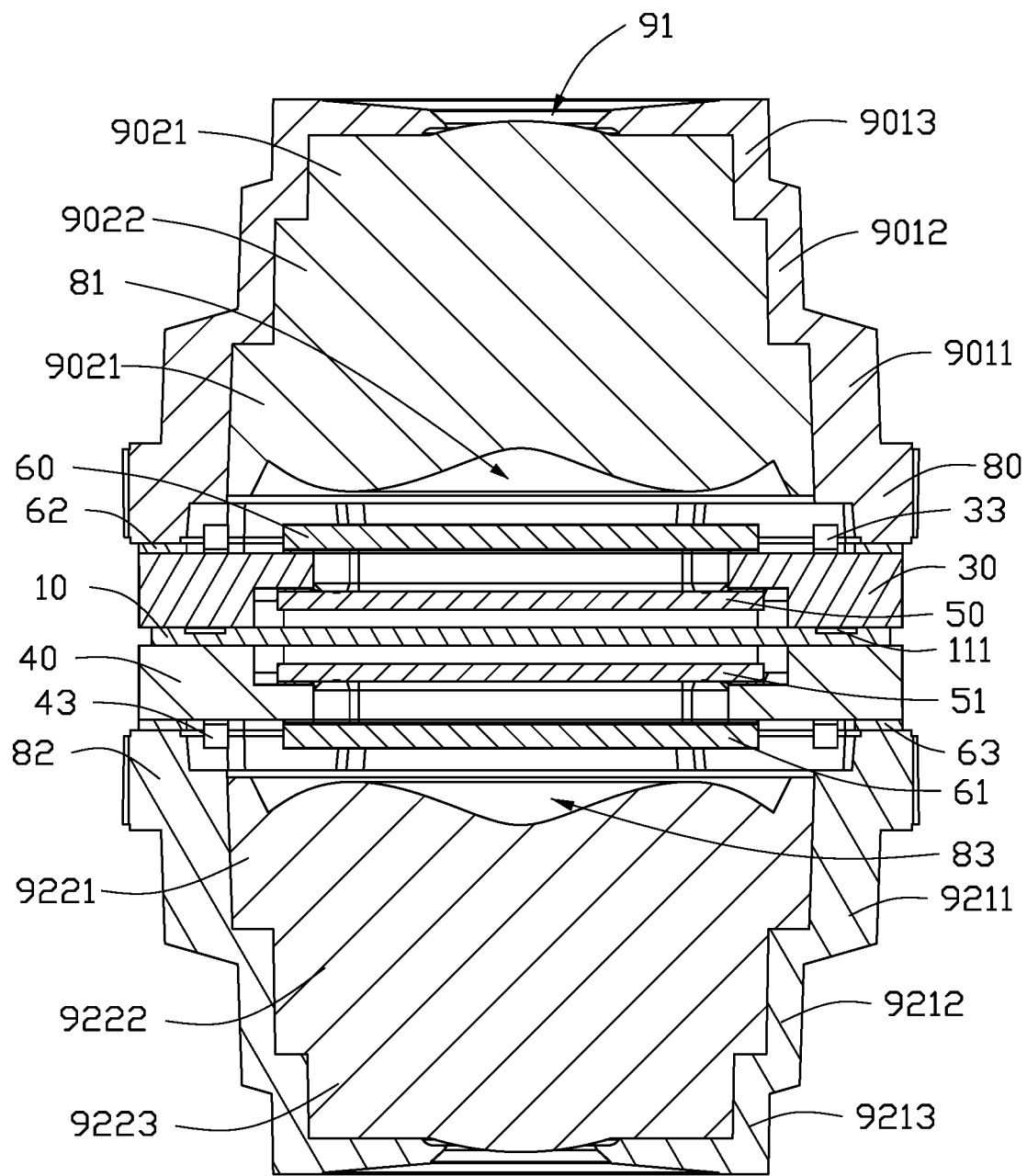
FIG. 4 is a cross-sectional view taken along line IV-IV in FIG. 1.

Referring to FIG. 4, the first photosensitive chip 50 is received in the first opening 31 and mounted on a surface of the first annular boss 32 facing the circuit board 10. The first filter 60 is mounted on a surface of the first annular boss 32 facing away from the circuit board 10 and faces the first photosensitive chip 50.

The second photosensitive chip 51 is received in the second opening 41 and mounted on a surface of the second annular boss 42 facing the circuit board 10. The second filter 61 is mounted on a surface of the second annular boss 42 facing away from the circuit board 10 and faces the second photosensitive chip 51.

The first lens assembly 70 is mounted on the surface of the first support base 30 facing away from the circuit board 10 and electrically connected to the first circuit interface 111 through the third circuit interface 301. The first lens assembly 70 includes a first lens holder 80 and a first lens unit 90. The first lens holder 80 is mounted on the first support base 30 through a first adhesive layer 62. The first lens holder 80 has a substantially rectangular structure. A first receiving hole 81 is defined in the first lens holder 80. A material of the first lens holder 80 may be metal or plastic.

The first lens unit 90 is received in the first receiving hole 81. The first lens unit 90 includes a first external lens 901 and a first inner lens 902. The first external lens 901 includes a first outer lens portion 9011, a second outer lens portion 9012, and a third outer lens portion 9013. The second outer lens portion 9012 is connected between the first outer lens portion 9011 and the third outer lens portion 9013. A diameter of the first outer lens portion 9011 is larger than a diameter of the second outer lens portion 9012, and the diameter of the second outer lens portion 9012 is larger than a diameter of the third outer lens portion 9013.

The first outer lens portion 9011, the second outer lens portion 9012, and the third outer lens portion 9013 may be separately formed or integrally formed. In one embodiment, the first outer lens portion 9011, the second outer lens portion 9012, and the third outer lens portion 9013 are integrally formed by molding.

The first inner lens 902 includes a first inner lens portion 9021, a second inner lens portion 9022, and a third inner lens portion 9023. The second inner lens portion 9022 is connected between the first inner lens portion 9021 and the third inner lens portion 9023. A diameter of the first inner lens portion 9021 is larger than a diameter of the second inner lens portion 9022, and the diameter of the second inner lens portion 9022 is larger than a diameter of the third inner lens portion 9023.

The first inner lens portion 9021, the second inner lens portion 9022, and the third inner lens portion 9023 may be separately formed or integrally formed. In one embodiment, the first inner lens portion 9021, the second inner lens portion 9022, and the third inner lens portion 9023 are integrally formed by molding.

The first external lens 901 and the first lens holder 80 may be separately formed or integrally formed. In one embodiment, the first external lens 901 defines a first through hole 91 passing through the first external lens 901, and the first through hole 91 communicates with the first receiving hole 81. The first inner lens 902 is received in the first through hole 91 and the first receiving hole 81.

The second lens assembly 71 is mounted on the surface of the second support base 40 facing away from the circuit board 10 and electrically connected to the second circuit interface 121 through the fourth circuit interface 401. The second lens assembly 71 may be substantially the same as the first lens assembly 70. The second lens assembly 71 includes a second lens holder 82 and a second lens unit 92. The second lens holder 82 is mounted on the second support base 40 through a second adhesive layer 63. The second lens holder 82 has a substantially rectangular structure. A second receiving hole 83 is defined in the second lens holder 82. A material of the second lens holder 82 may be metal or plastic.

The second lens unit 92 is received in the second receiving hole 83. The second lens unit 92 includes a second external lens 921 and a second inner lens 922. The second external lens 921 includes a fourth outer lens portion 9211, a fifth outer lens portion 9212, and a sixth outer lens portion 9213. The fifth outer lens portion 9212 is connected between the fourth outer lens portion 9211 and the sixth outer lens portion 9213. A diameter of the fourth outer lens portion 9211 is larger than a diameter of the fifth outer lens portion 9212, and the diameter of the fifth outer lens portion 9212 is larger than a diameter of the sixth outer lens portion 9213.

The fourth outer lens portion 9211, the fifth outer lens portion 9212, and the sixth outer lens portion 9213 may be separately formed or integrally formed. In one embodiment, the second external lens 921 is formed by integrally molding the fourth outer lens portion 9211, the fifth outer lens portion 9212, and the sixth outer lens portion 9213.

The second inner lens 922 includes a fourth inner lens portion 9221, a fifth inner lens portion 9222, and a sixth inner lens portion 9223. The fifth inner lens portion 9222 is connected between the fourth inner lens portion 9221 and the sixth inner lens portion 9223. A diameter of the fourth inner lens portion 9221 is larger than a diameter of the fifth inner lens portion 9222, and the diameter of the fifth inner lens portion 9222 is larger than a diameter of the sixth inner lens portion 9223.

The fourth inner lens portion 9221, the fifth inner lens portion 9222, and the sixth inner lens portion 9223 may be separately formed or integrally formed. In one embodiment, the second inner lens 922 is formed by integrally molding the fourth inner lens portion 9221, the fifth inner lens portion 9222, and the sixth inner lens portion 9223.

The second external lens 921 and the second lens holder 82 may be separately formed or integrally formed. In one embodiment, the second external lens 921 defines a second through hole 93 passing through the second external lens 921, and the second through hole 93 communicates with the second receiving hole 83. The second inner lens 922 is received in the second through hole 93 and the second receiving hole 83.

The lens module 100 further includes a first reinforcing adhesive 94 and a second reinforcing adhesive 95. The first reinforcing adhesive 94 is located on the first surface 11 on the flexible portion 103, and the second reinforcing adhesive 95 is located on the second surface 12 on the flexible portion 103. The first reinforcing adhesive 94 and the second reinforcing adhesive 95 enhance a mechanical strength of the circuit board 10 by enhancing a mechanical strength of the flexible portion 103. The first reinforcing adhesive 94 and the second reinforcing adhesive 95 may be made of a polymer material. Specifically, the polymer material has high mechanical strength.

Figure 5:
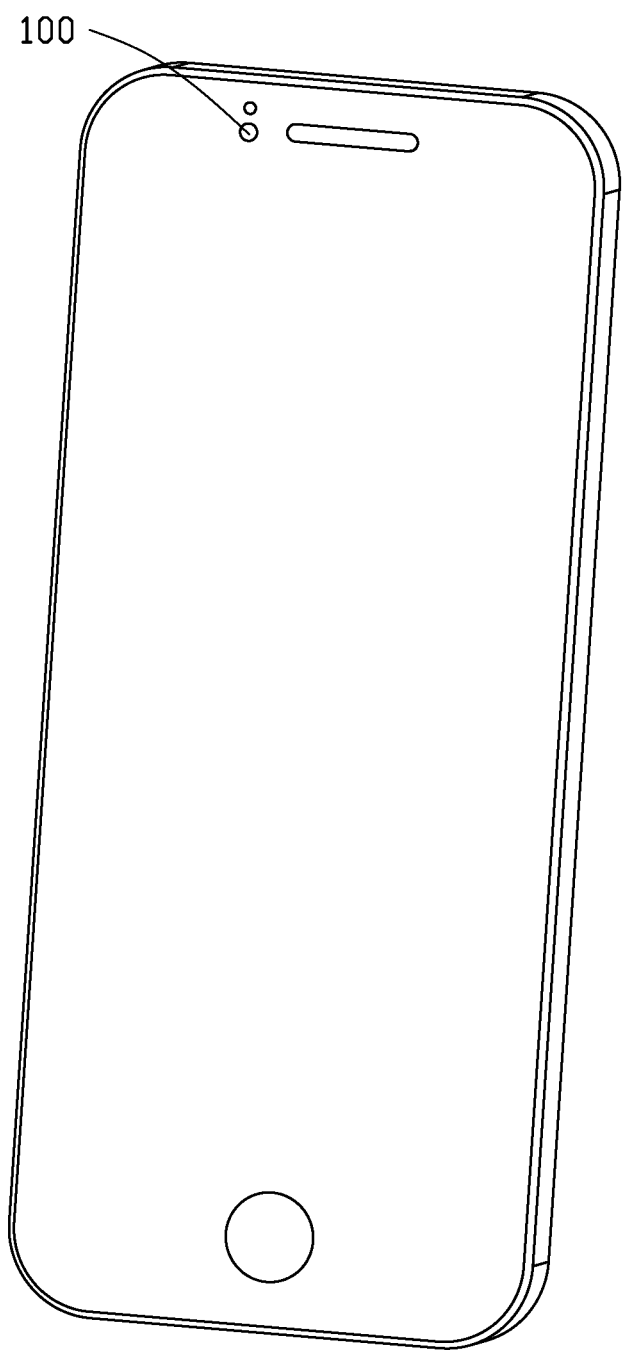
FIG. 5 is an assembled, isometric view of an embodiment of an electronic device including the lens module.

FIG. 5 shows an embodiment of an electronic device 200 including the lens module 100. The electronic device 200 may be a mobile phone, a wearable device, a vehicle, a camera, or a monitoring device. In one embodiment, the lens module 100 is applied to a mobile phone. The mobile phone has front and back cameras.

The first circuit interface 111 and the second circuit interface 121 are respectively provided on the first surface 11 and the second surface 12 of the circuit board 10. Thus, the circuit board 10 is double-sided. The third circuit interface 301 on the first support base 30 electrically connects the first lens assembly 70 to the first circuit interface 111, and the fourth circuit interface 401 electrically connects the second lens assembly 71 to the second circuit interface 121. Thus, the first lens assembly 70 and the second lens assembly 71 share the same circuit board 10, thereby realizing a double-sided shooting function of the lens module 100.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A lens module comprising:
a circuit board comprising a first surface and a second surface opposite the first surface, the first surface and the second surface respectively provided with a first circuit interface and a second circuit interface;
a first support base;
a second support base;
a first lens assembly; and
a second lens assembly; wherein:
the first support base is mounted on the first surface;
a third circuit interface is provided on a surface of the first support base facing the circuit board for electrical connection with the first circuit interface;
the first lens assembly is mounted on a surface of the first support base facing away from the circuit board and electrically coupled to the circuit board through the third circuit interface and the first circuit interface;
the second support base is mounted on the second surface;
a fourth circuit interface is provided on a surface of the second support base facing the circuit board for electrical connection with the second circuit interface; and
the second lens assembly is mounted on a surface of the second support base facing away from the circuit board and electrically coupled to the circuit board through the fourth circuit interface and the second circuit interface.

2. The lens module of claim 1, wherein:
the circuit board comprises a first hard portion, a second hard portion, and a flexible portion;
the flexible portion is between the first hard portion and the second hard portion;
the first circuit interface and the second circuit interface are located on the first hard portion;
a reinforcement plate is mounted on the second surface on the second hard portion; and
an electrical connection portion is mounted on the first surface on the second hard portion.

3. The lens module of claim 1, further comprising a first filter, wherein:
the first support base defines a first opening passing through the first support base;
the first support base comprises a first annular boss extending from an inner wall of the first opening toward a central axis of the first opening; and
the first filter is mounted on a surface of the first annular boss facing away from the circuit board.

4. The lens module of claim 3, further comprising a first photosensitive chip, wherein:
the first photosensitive chip is received in the first opening and mounted on a surface of the first annular boss facing the circuit board; and
the first photosensitive chip faces the first filter.

5. The lens module of claim 1, further comprising a second filter, wherein:
a second opening is defined in the second support base and passes through the second support base;
the second support base comprises a second annular boss extending from an inner wall of the second opening toward a central axis of the second opening; and
the second filter is mounted on a surface of the second annular boss facing away from the circuit board.

6. The lens module of claim 5, further comprising a second photosensitive chip, wherein:
the second photosensitive chip is received in the second opening and mounted on a surface of the second annular boss facing the circuit board; and
the second filter faces the second photosensitive chip.

7. The lens module of claim 1, wherein:
the first lens assembly comprises a first lens holder and a first lens unit;
the first lens holder is mounted on the first support base through a first adhesive layer;
a first receiving hole is defined in the first lens holder; and
the first lens unit is received in the first receiving hole.

8. The lens module of claim 7, wherein:
the first lens unit comprises a first external lens and a first inner lens;
the first external lens defines a first through hole passing through the first external lens, the first through hole communicating with the first receiving hole, and the first inner lens received in the first through hole and the first receiving hole;
the first external lens comprises a first outer lens portion, a second outer lens portion, and a third outer lens portion;
the second outer lens portion is coupled between the first outer lens portion and the third outer lens portion;
a diameter of the first outer lens portion is larger than a diameter of the second outer lens portion, and the diameter of the second outer lens portion is larger than a diameter of the third outer lens portion;
the first inner lens comprises a first inner lens portion, a second inner lens portion, and a third inner lens portion;
the second inner lens portion is coupled between the first inner lens portion and the third inner lens portion;
a diameter of the first inner lens portion is larger than a diameter of the second inner lens portion, and the diameter of the second inner lens portion is larger than a diameter of the third inner lens portion.

9. The lens module of claim 8, wherein:
the second lens assembly comprises a second lens holder and a second lens unit;
the second lens holder is mounted on the second support base through a second adhesive layer;

a second receiving hole is defined in the second lens holder; and the second lens unit is received in the second receiving hole.

10. The lens module of claim 9, wherein:

the second lens unit comprises a second external lens and a second inner lens;

the second external lens defines a second through hole passing through the second external lens, the second through hole communicating with the second receiving hole, and the second inner lens received in the second through hole and the second receiving hole;

the second external lens comprises a fourth outer lens portion, a fifth outer lens portion, and a sixth outer lens portion;

the fifth outer lens portion is coupled between the fourth outer lens portion and the sixth outer lens portion;

a diameter of the fourth outer lens portion is larger than a diameter of the fifth outer lens portion, and the diameter of the fifth outer lens portion is larger than a diameter of the sixth outer lens portion;

the second inner lens comprises a fourth inner lens portion, a fifth inner lens portion, and a sixth inner lens portion;

the fifth inner lens portion is coupled between the fourth inner lens portion and the sixth inner lens portion; and a diameter of the fourth inner lens portion is larger than a diameter of the fifth inner lens portion, and the diameter of the fifth inner lens portion is larger than a diameter of the sixth inner lens portion.

11. An electronic device comprising a lens module, the lens module comprising:

a circuit board comprising a first surface and a second surface opposite the first surface, the first surface and the second surface respectively provided with a first circuit interface and a second circuit interface;

a first support base;

a second support base;

a first lens assembly; and a second lens assembly; wherein:

the first support base is mounted on the first surface;

a third circuit interface is provided on a surface of the first support base facing the circuit board for electrical connection with the first circuit interface;

the first lens assembly is mounted on a surface of the first support base facing away from the circuit board and electrically coupled to the circuit board through the third circuit interface and the first circuit interface;

the second support base is mounted on the second surface;

a fourth circuit interface is provided on a surface of the second support base facing the circuit board for electrical connection with the second circuit interface; and the second lens assembly is mounted on a surface of the second support base facing away from the circuit board and electrically coupled to the circuit board through the fourth circuit interface and the second circuit interface.

12. The electronic device of claim 11, wherein:

the circuit board comprises a first hard portion, a second hard portion, and a flexible portion;

the flexible portion is between the first hard portion and the second hard portion;

the first circuit interface and the second circuit interface are located on the first hard portion;

a reinforcement plate is mounted on the second surface on the second hard portion; and an electrical connection portion is mounted on the first surface on the second hard portion.

13. The electronic device of claim 11, further comprising a first filter, wherein:

the first support base defines a first opening passing through the first support base;

the first support base comprises a first annular boss extending from an inner wall of the first opening toward a central axis of the first opening; and the first filter is mounted on a surface of the first annular boss facing away from the circuit board.

14. The electronic device of claim 13, further comprising a first photosensitive chip, wherein:

the first photosensitive chip is received in the first opening and mounted on a surface of the first annular boss facing the circuit board; and the first photosensitive chip faces the first filter.

15. The electronic device of claim 11, further comprising a second filter, wherein:

a second opening is defined in the second support base and passes through the second support base;

the second support base comprises a second annular boss extending from an inner wall of the second opening toward a central axis of the second opening; and the second filter is mounted on a surface of the second annular boss facing away from the circuit board.

16. The electronic device of claim 15, further comprising a second photosensitive chip, wherein:

the second photosensitive chip is received in the second opening and mounted on a surface of the second annular boss facing the circuit board; and the second filter faces the second photosensitive chip.

17. The electronic device of claim 11, wherein:

the first lens assembly comprises a first lens holder and a first lens unit;

the first lens holder is mounted on the first support base through a first adhesive layer;

a first receiving hole is defined in the first lens holder; and the first lens unit is received in the first receiving hole.

18. The electronic device of claim 17, wherein:

the first lens unit comprises a first external lens and a first inner lens;

the first external lens defines a first through hole passing through the first external lens, the first through hole communicating with the first receiving hole, and the first inner lens received in the first through hole and the first receiving hole;

the first external lens comprises a first outer lens portion, a second outer lens portion, and a third outer lens portion;

the second outer lens portion is coupled between the first outer lens portion and the third outer lens portion;

a diameter of the first outer lens portion is larger than a diameter of the second outer lens portion, and the diameter of the second outer lens portion is larger than a diameter of the third outer lens portion;

the first inner lens comprises a first inner lens portion, a second inner lens portion, and a third inner lens portion;

the second inner lens portion is coupled between the first inner lens portion and the third inner lens portion;

a diameter of the first inner lens portion is larger than a diameter of the second inner lens portion, and the diameter of the second inner lens portion is larger than a diameter of the third inner lens portion.

19. The electronic device of claim 18, wherein:

the second lens assembly comprises a second lens holder and a second lens unit;

the second lens holder is mounted on the second support base through a second adhesive layer;

a second receiving hole is defined in the second lens holder; and the second lens unit is received in the second receiving hole.

20. The electronic device of claim 19, wherein:

the second lens unit comprises a second external lens and a second inner lens;

the second external lens defines a second through hole passing through the second external lens, the second through hole communicating with the second receiving hole, and the second inner lens received in the second through hole and the second receiving hole;

the second external lens comprises a fourth outer lens portion, a fifth outer lens portion, and a sixth outer lens portion;

the fifth outer lens portion is coupled between the fourth outer lens portion and the sixth outer lens portion;

a diameter of the fourth outer lens portion is larger than a diameter of the fifth outer lens portion, and the diameter of the fifth outer lens portion is larger than a diameter of the sixth outer lens portion;

the second inner lens comprises a fourth inner lens portion, a fifth inner lens portion, and a sixth inner lens portion;

the fifth inner lens portion is coupled between the fourth inner lens portion and the sixth inner lens portion; and a diameter of the fourth inner lens portion is larger than a diameter of the fifth inner lens portion, and the diameter of the fifth inner lens portion is larger than a diameter of the sixth inner lens portion.

\* \* \* \* \*